United States Patent [19]

Morita et al.

[11] 4,310,128

[45] Jan. 12, 1982

[54] SEAT BELT RETRACTING AND WINDING DEVICE

[75] Inventors: Masayuki Morita, Tokoname; Takashi Kawaharazaki, Ichinomiya; Toshiaki Shimogawa, Nishio, all of Japan

[73] Assignee: Nippon Soken, Inc., Nishio, Japan

[21] Appl. No.: 787,534

[22] Filed: Apr. 14, 1977

Related U.S. Application Data

[63] Continuation of Ser. No. 656,850, Feb. 10, 1976, abandoned.

[30] Foreign Application Priority Data

Feb. 18, 1975 [JP] Japan ................................. 50-20673
Aug. 9, 1975 [JP] Japan ................................. 50-96771
Aug. 9, 1975 [JP] Japan ................................. 50-96775

[51] Int. Cl.³ ....................... A62B 35/02; B65H 75/48
[52] U.S. Cl. ........................... 242/107; 242/107.4 R
[58] Field of Search ........................ 242/107–107.7; 185/9–10, 37, 39; 280/802–808; 297/474–480

[56] References Cited

U.S. PATENT DOCUMENTS 3,007,653 11/1961 Becker .............................. 242/107.5
3,337,155 8/1967 Binding ............................ 242/107
3,384,321 5/1968 Becker et al. ................... 242/107.5
3,929,210 12/1975 Cutler et al. .................... 242/107 X
3,957,222 5/1976 Bladh .......................... 242/107.4 R X
3,984,063 10/1976 Knieriemen .................. 242/107.4 R
3,997,126 12/1976 Karlsson ........................... 242/107

Primary Examiner—John M. Jillions
Attorney, Agent, or Firm—Cushman, Darby & Cushman

[57] ABSTRACT

A seat belt retracting and winding device in which a seat belt may be automatically retracted and wound on a winding reel under restoring or unwinding spring force of spiral springs. A cylindrical ratchet wheel is coaxially rotatably supported on a shaft of a winding reel, and is covered with a case attached to one of the side plates of a frame of the device. There are provided a first spiral spring disposed in a doughnut-shaped space defined between the case and the ratchet wheel, and a second spiral spring disposed in the ratchet wheel. The first spring has one end fixed to the case and the other end fixed to the ratchet wheel, while the second spring has one end fixed to the ratchet wheel and the other end fixed to the shaft of the reel. The ratchet wheel is formed with a plurality of ratchet teeth on its periphery, and a ratchet is pivotally disposed in the case for releasable engagement with the ratchet wheel teeth. While the seat belt is being paid out both the first and the second springs are wound, however, after the seat belt has been fastened to the vehicle occupant the engagement of the ratchet with the ratchet wheel locks the ratchet wheel against rotation, thereby preventing the first spring from exerting the unwinding spring force to the winding reel, thus reducing unpleasant restraining force applied to the vehicle occupant.

29 Claims, 21 Drawing Figures

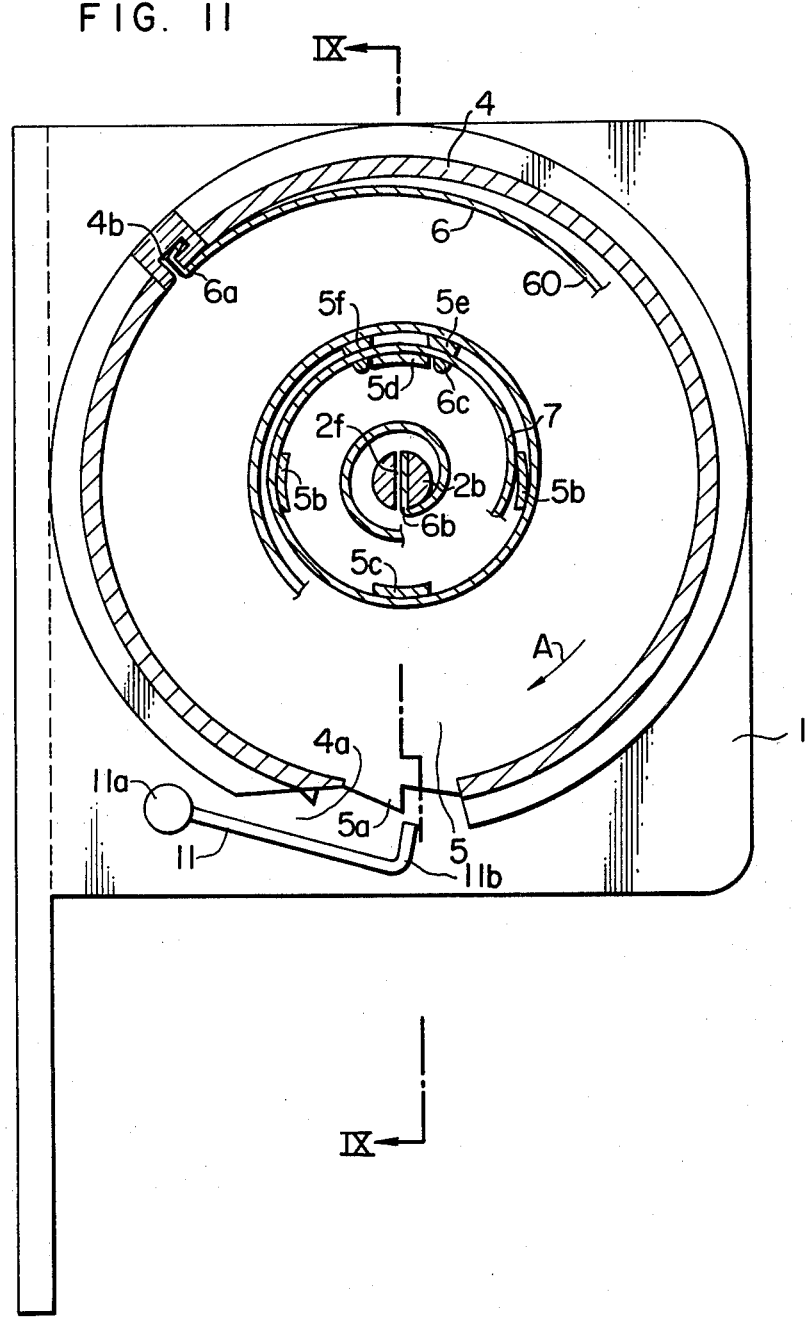

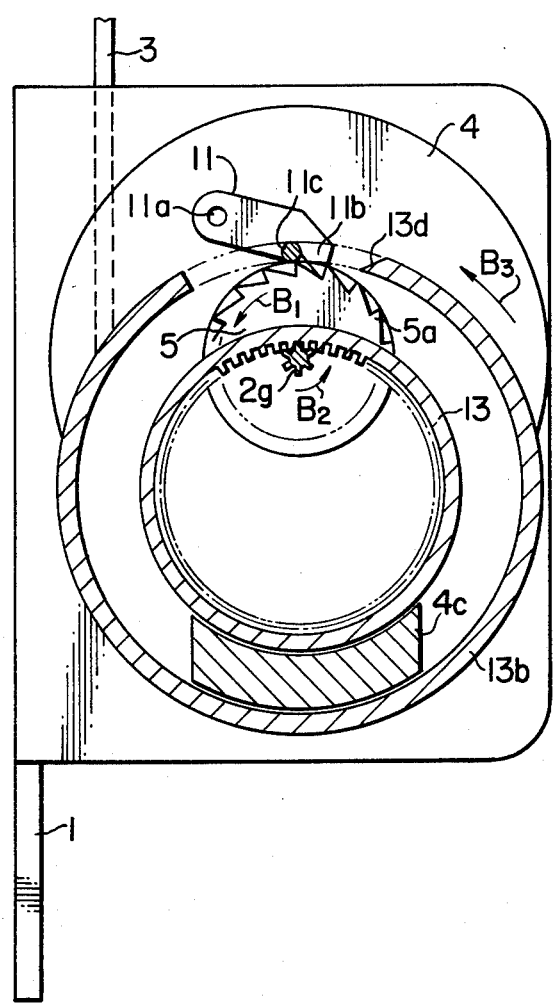

SEAT BELT RETRACTING AND WINDING DEVICE

This application is a continuation of our copending application Ser. No. 656,850, filed Feb. 10, 1976, which was abandoned after the filing hereof.

BACKGROUND OF THE INVENTION

1. Field of the Invention

The present invention relates to a seat belt retracting and winding device of the type in which a seat belt may be automatically retracted and wound on a winding reel under restoring or unwinding spring force of spiral springs, and more particularly to a seat belt retracting and winding device which may exert a reduced retracting and winding force to the seat belt after it has been fastened across the vehicle occupant.

2. Brief Description of Prior Art

There have conventionally been known seat belt retracting and winding devices which contain only one spiral spring having its one end attached to a shaft of a winding reel and the other end attached to the body of a retractor. In these devices, when the seat belt is paid out and thus the winding reel is rotated, the spiral spring is wound to exert an unwinding or restoring spring force to the seat belt, thereby retracting and winding the latter onto the winding reel. Generally the spiral spring used in these devices exerts an increased unwinding spring force to the seat belt according to the increase in length of the seat belt paid out. Therefore, when the seat belt is paid out in larger length and fastened across the occupant, the winding spring force of the spiral spring exerts a large restraining or tightening force to the seat belt. Such large restraining force not only brings about an uncomfortable feeling to the occupant but also prevents his smooth movement. In cases where the large restraining force is exerted to the driver, the movement of the driver is restricted so that the safe driving operations will be adversely affected.

In the conventional devices of the type in which a lap belt and a shoulder belt are made of a continuous webbing and winding means is disposed on the shoulder belt side, it is necessary to pay out the seat belt in particularly larger length, so that the restraining force exerted to the occupant becomes very large. Further, in a passive seat belt system in which the length of the seat belt paid out is further increased, the occupant experiences much more uncomfortable restraining force.

In the seat belt retracting and winding devices of the type described, it is desirable to reduce the unwinding spring force of the spiral spring in order that the restraining force exerted to the occupant may be reduced. However, the reduced spring force brings about a disadvantage such that the seat belt is not completely retracted and wound on the winding reel when the seat belt is unfastened or released.

SUMMARY OF THE INVENTION

It is therefore a primary object of the present invention to provide an improved seat belt retracting and winding device which avoids the aforesaid disadvantages experienced with the conventional devices of the type described, in which a reduced retracting or tightening force is exerted to the seat belt when the latter has been fastened across the vehicle occupant while an increased retracting force is exerted when it is released.

It is another object of the present invention to provide an improved seat belt retracting and winding device which reduces the retracting or tightening force of the seat belt when the latter has been fastened, by utilizing two spiral springs both of which are wound while the seat belt is being paid out, and making only one spiral spring exert the unwinding spring force to the seat belt with the other spring locked from exerting the unwinding spring force thereto.

It is a further object of the present invention to provide an improved seat belt retracting and winding device which reduces the retracting or tightening force of the seat belt when the latter has been fastened, by utilizing two spiral springs, one of which is wound during about one rotation of the winding reel while the seat belt is being paid out and exerts the unwinding spring force to the seat belt when it has been fastened, whereas during further rotation thereof the other is wound.

BRIEF DESCRIPTION OF THE INVENTION

Figure 9:
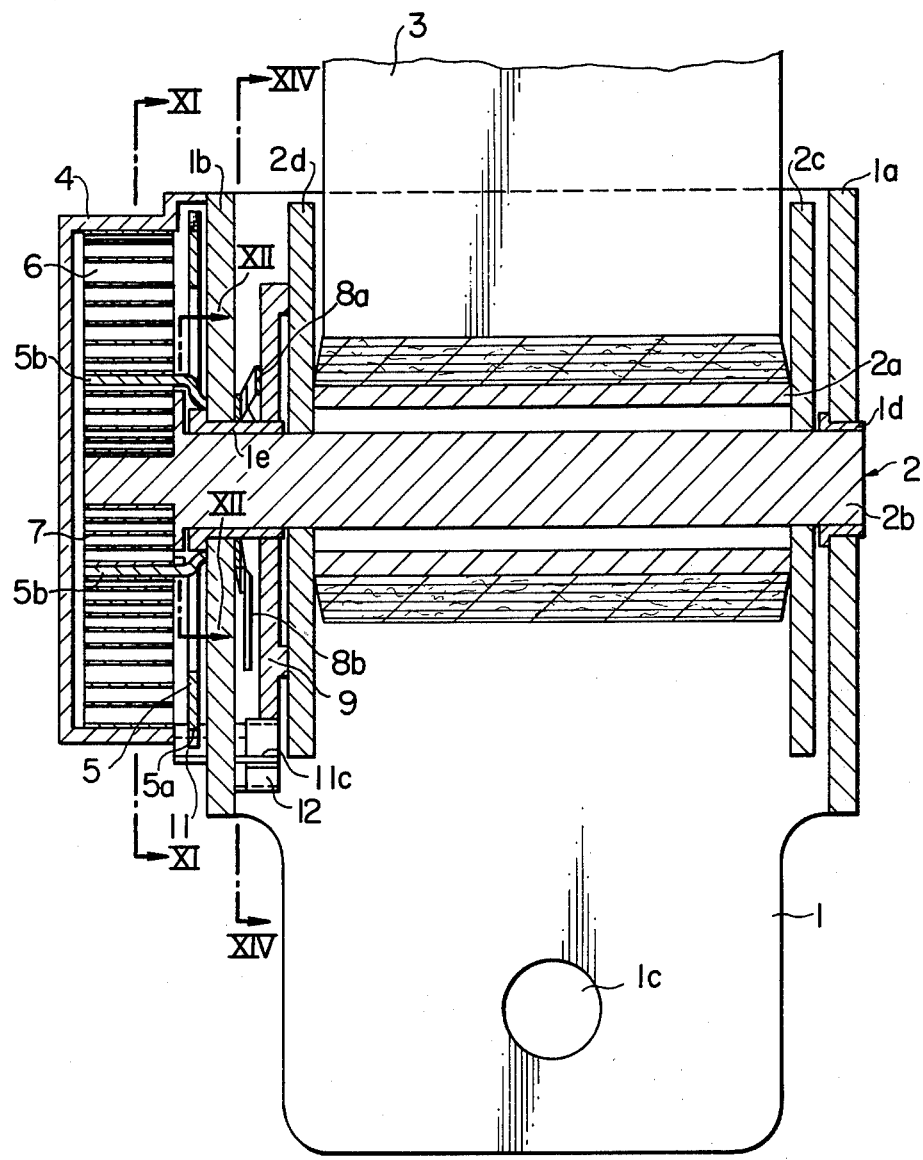
FIG. 9 is a sectional view taken along the line IX—IX of FIG. 11, illustrating a second embodiment of the present invention.
Figure 10A:
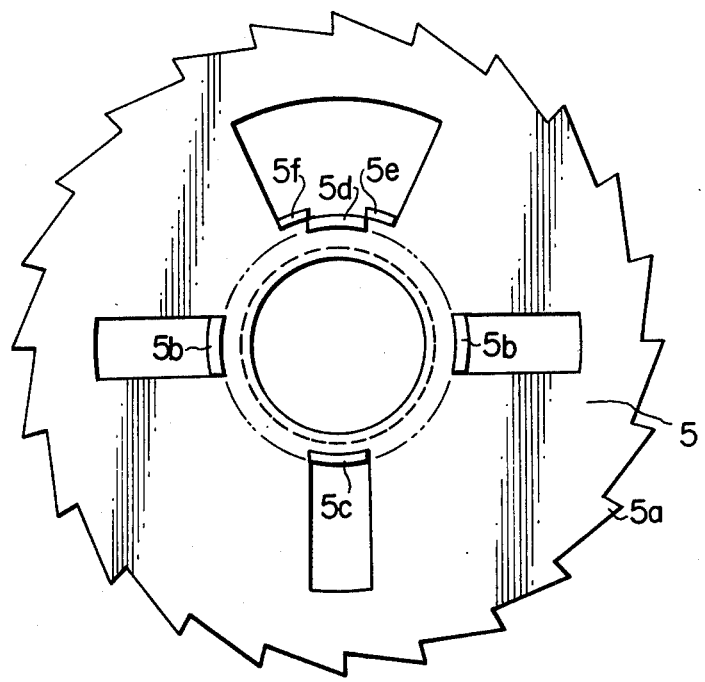
Figure 10B:
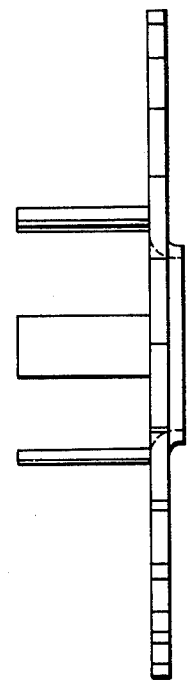
Figure 12:
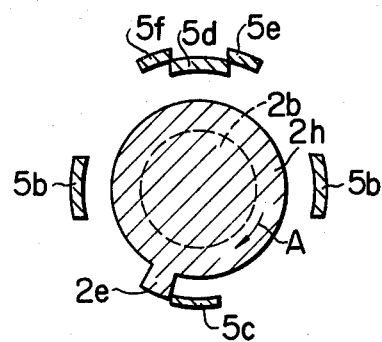
Figure 13:
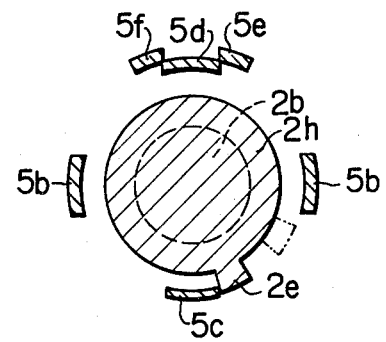
Figure 14:
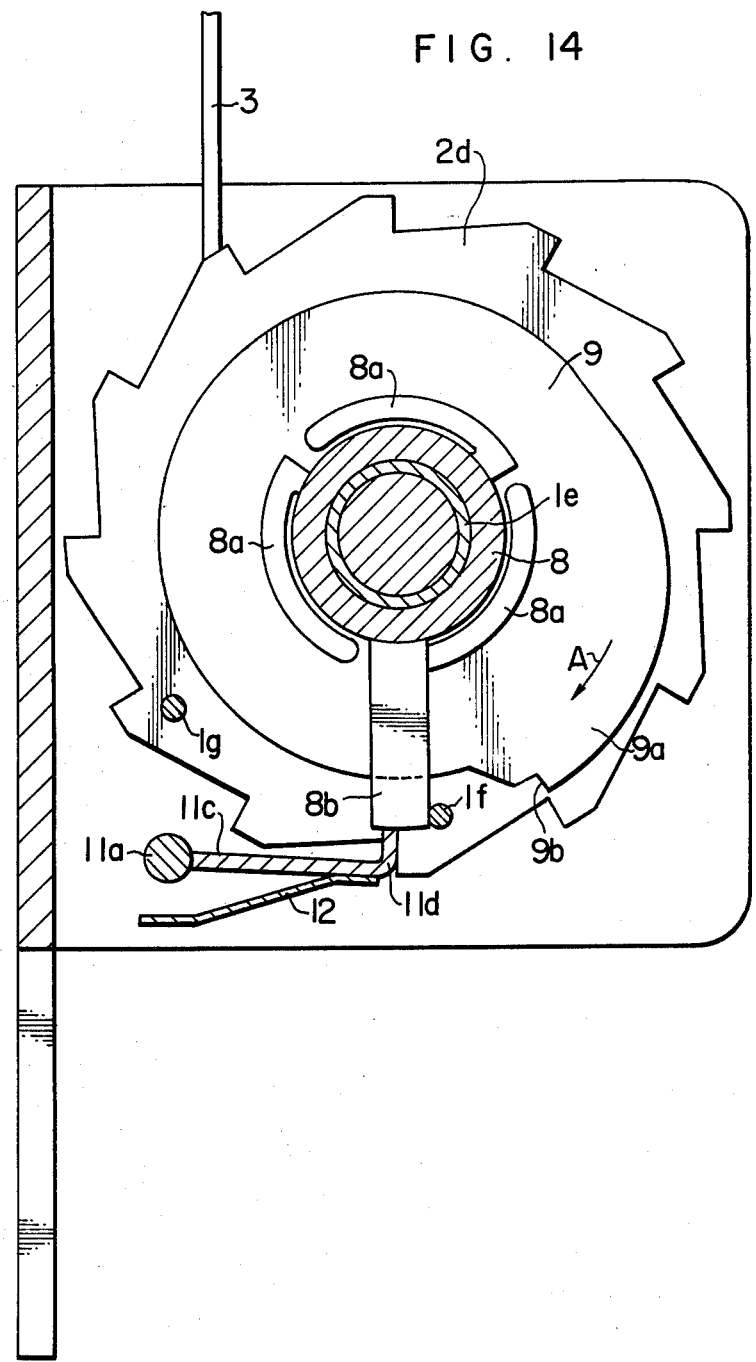
Figure 15:
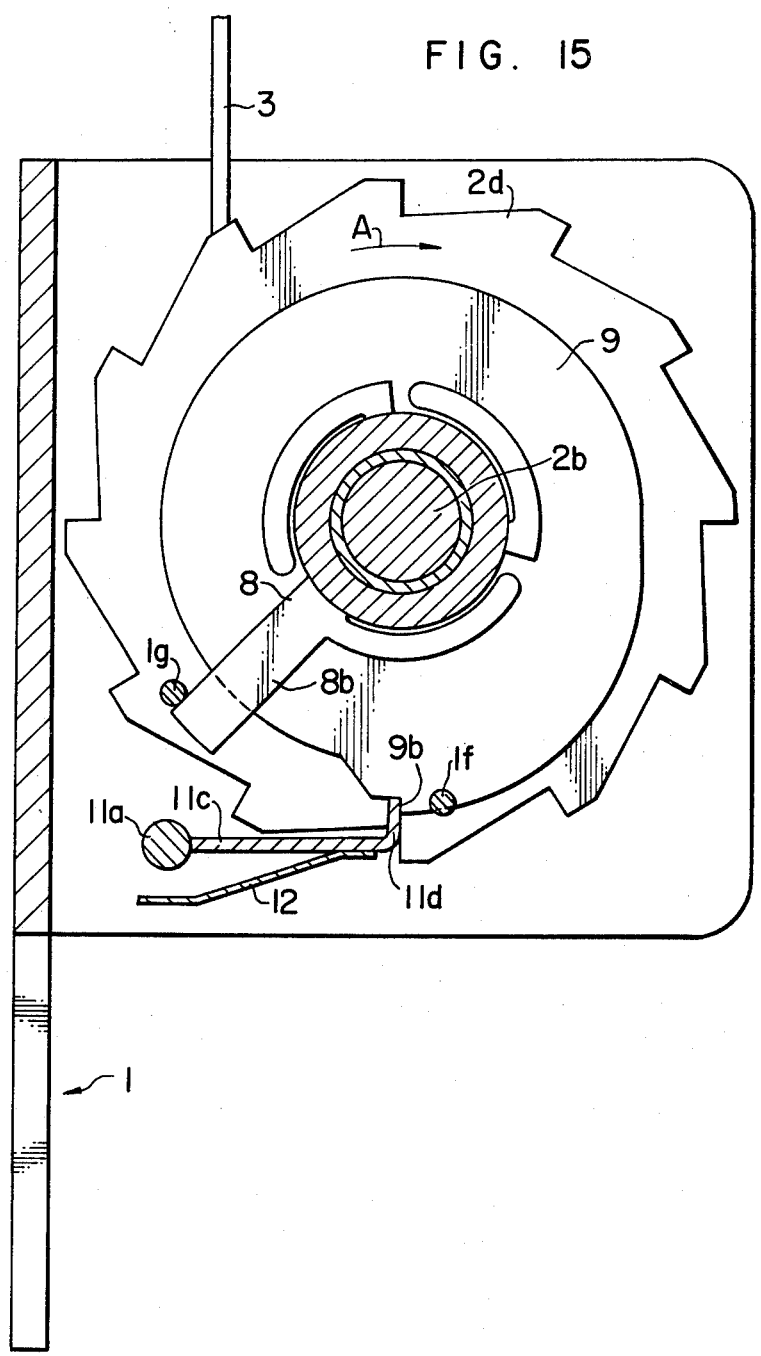
Figure 16:
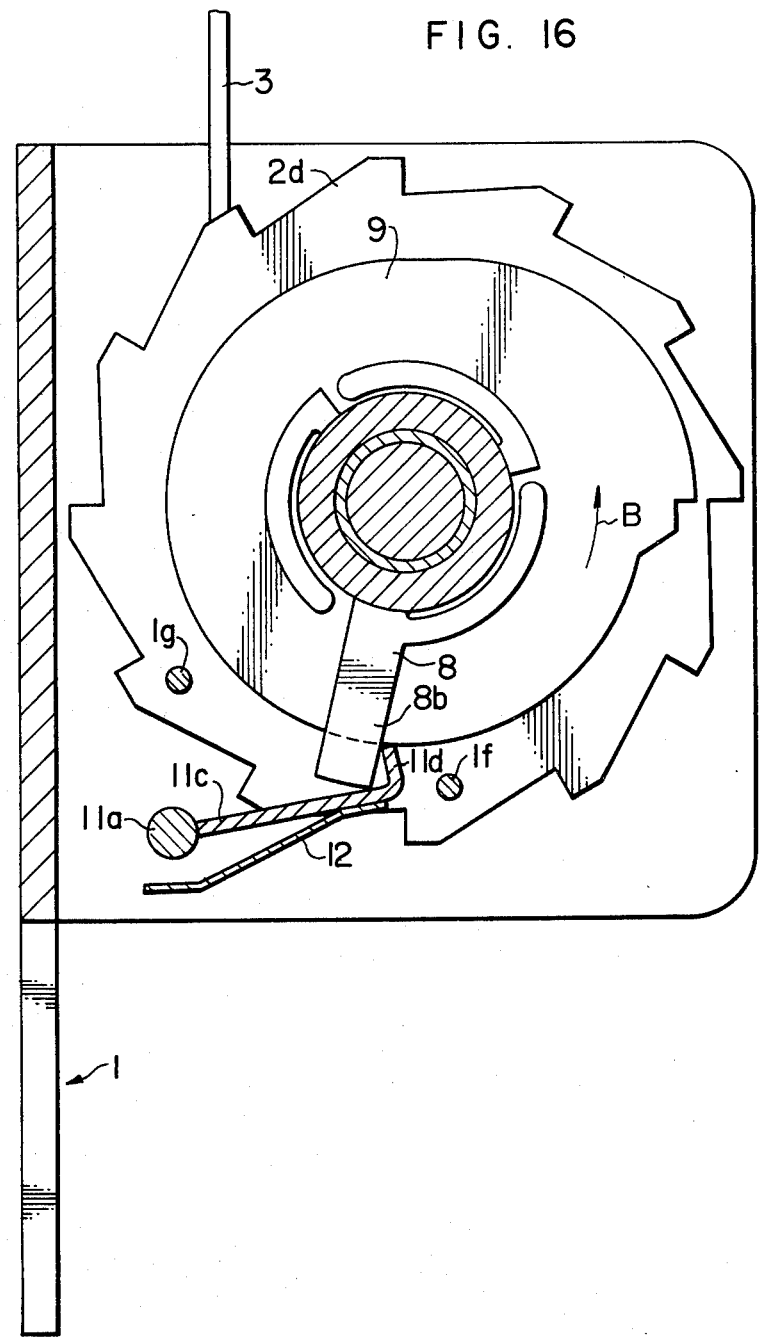
Figure 17:
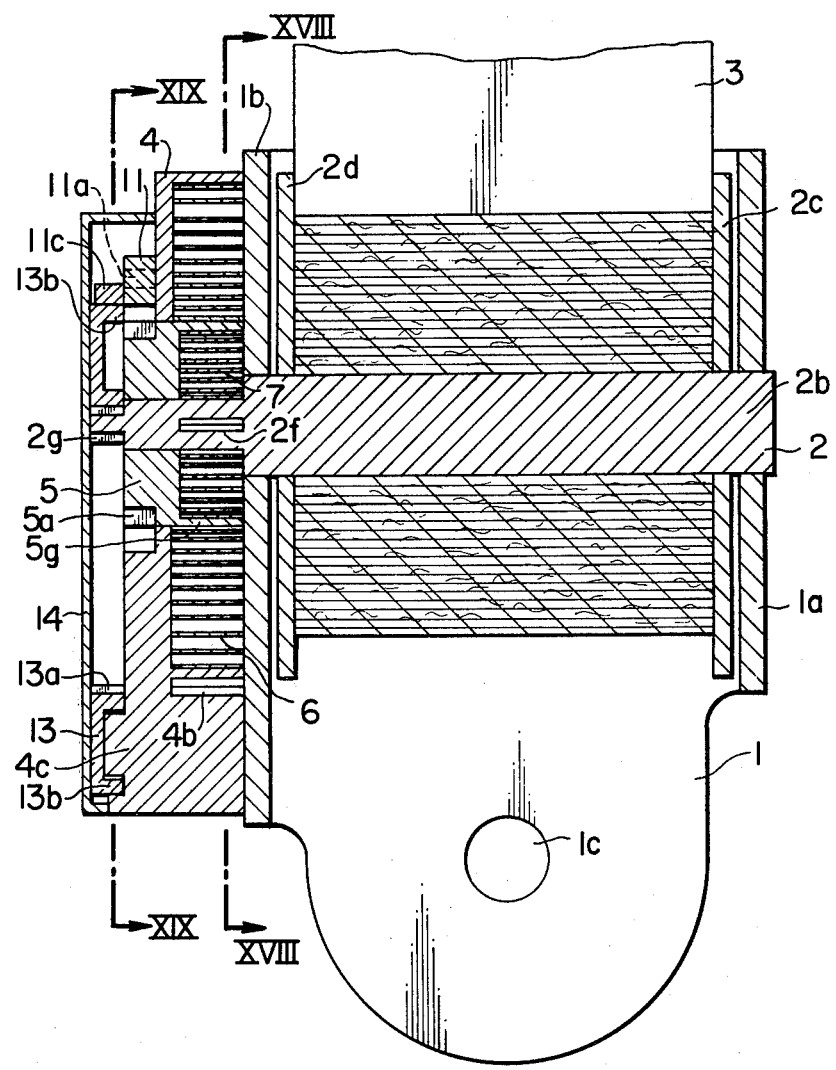
Figure 18:
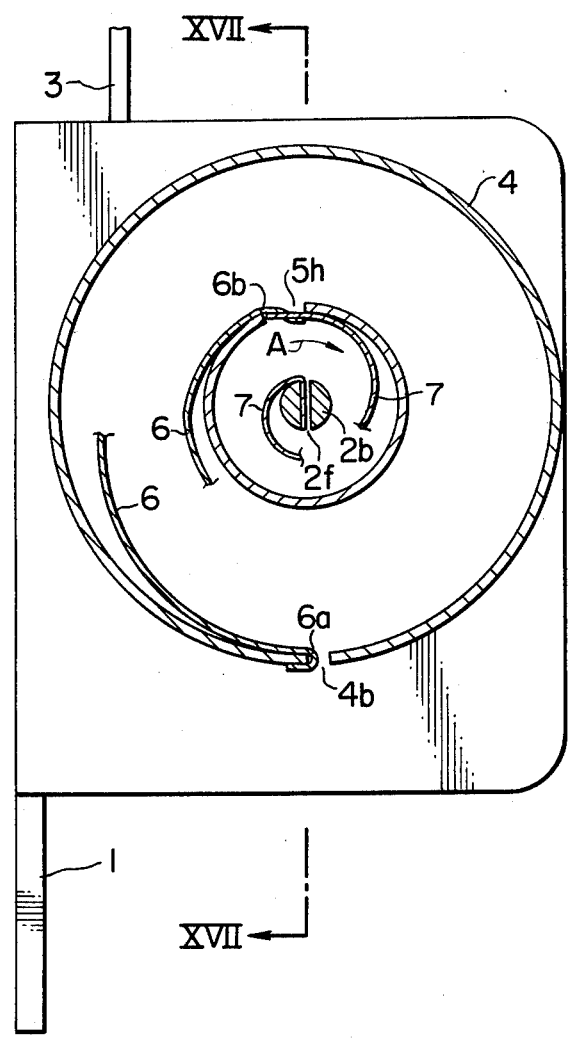
Figure 19:
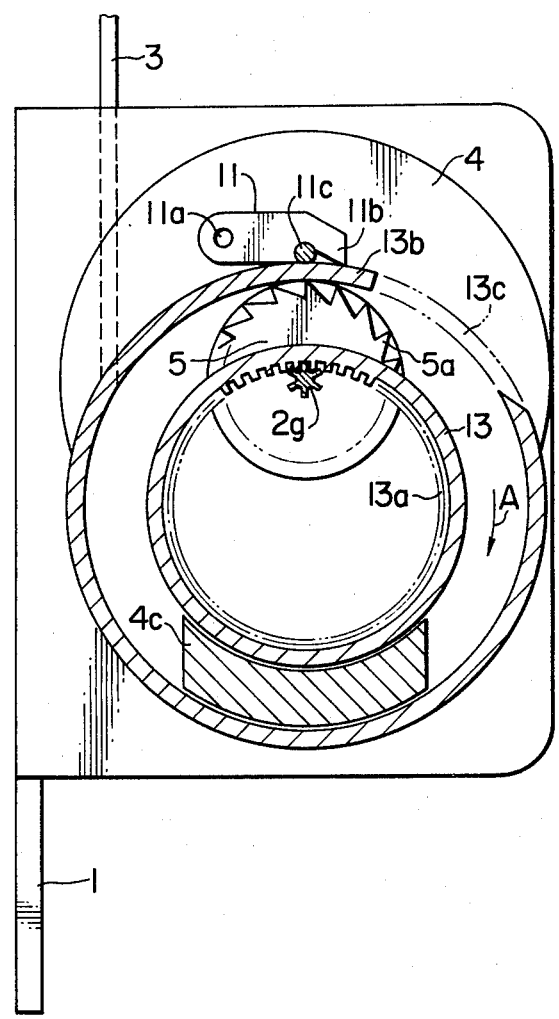

FIGS. 10(A) and 10(B) are top and side views, respectively, of a ratchet wheel shown in FIG. 9;

FIG. 11 is a cross sectional view taken along the line XI—XI of FIG. 9;

FIG. 12 is a cross sectional view taken along the line XII—XII of FIG. 9, illustrating the engagement of a shaft of a winding reel with a ratchet wheel when a seat belt is completely retracted and wound on a winding reel;

FIG. 13 is a cross sectional view similar to FIG. 12, illustrating the engagement of the shaft with the ratchet wheel when the seat belt is paid out;

FIG. 14 is a cross sectional view taken along the line XIV—XIV of FIG. 9, showing an operating lever engaged with a lever of a leaf spring;

FIGS. 15 and 16 are cross sectional views similar to FIG. 14, showing the operating lever engaged with a friction disk in different positions;

FIG. 17 is a sectional view taken along the line XVII—XVII of FIG. 18, illustrating a third embodiment of the present invention;

FIG. 18 is a cross sectional view taken along the line XVIII—XVIII of FIG. 17;

FIG. 19 is a cross sectional view taken along the line XIX—XIX of FIG. 17, showing a ratchet engaged with a cam gear member; and FIG. 20 is a cross sectional view similar to FIG. 19, showing the ratchet engaged with a ratchet wheel.

Same or similar reference numerals are used to designate same or similar parts throughout the figures.

DESCRIPTION OF THE PREFERRED EMBODIMENTS

First Embodiment, FIGS. 1 through 8

Figure 1:
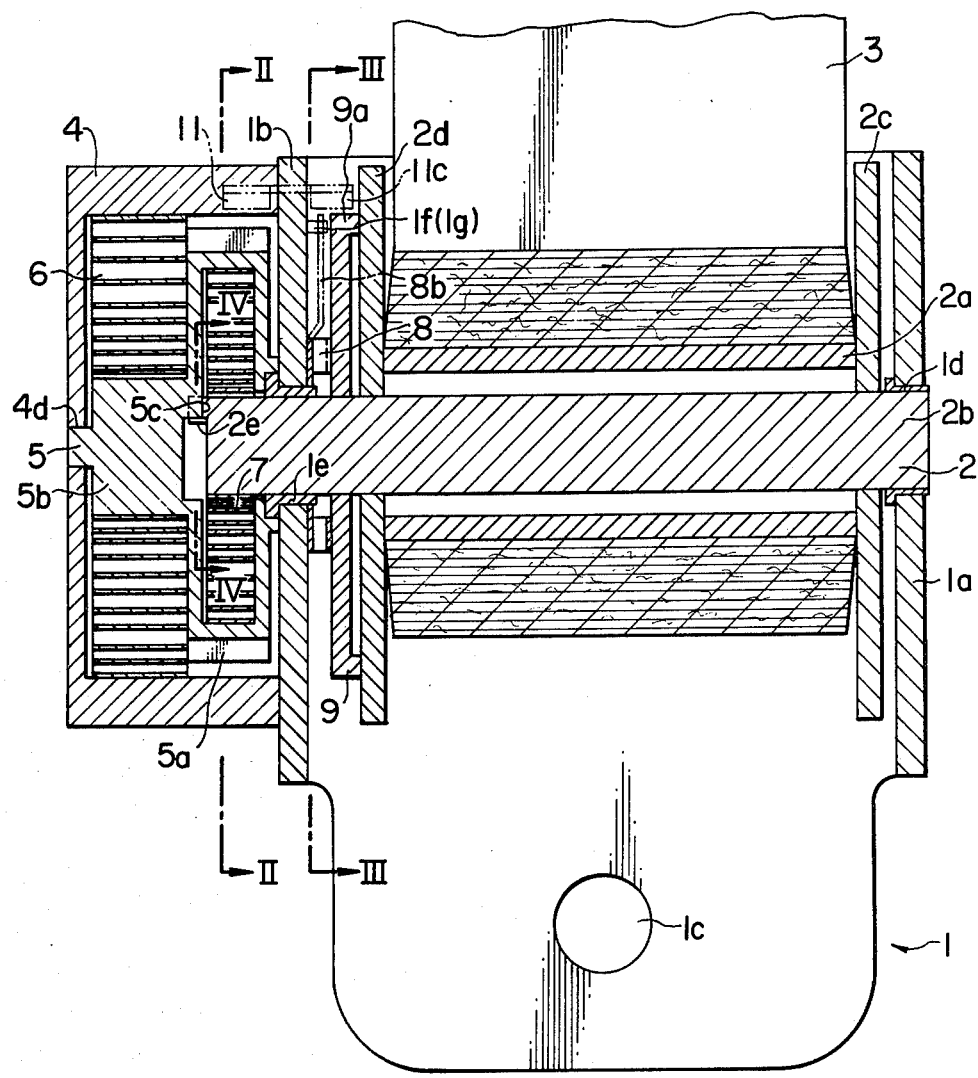
FIG. 1 is a sectional view taken along the line I—I of FIG. 2, illustrating a first embodiment of a seat belt retracting and winding device in accordance with the present invention.
Figure 2:
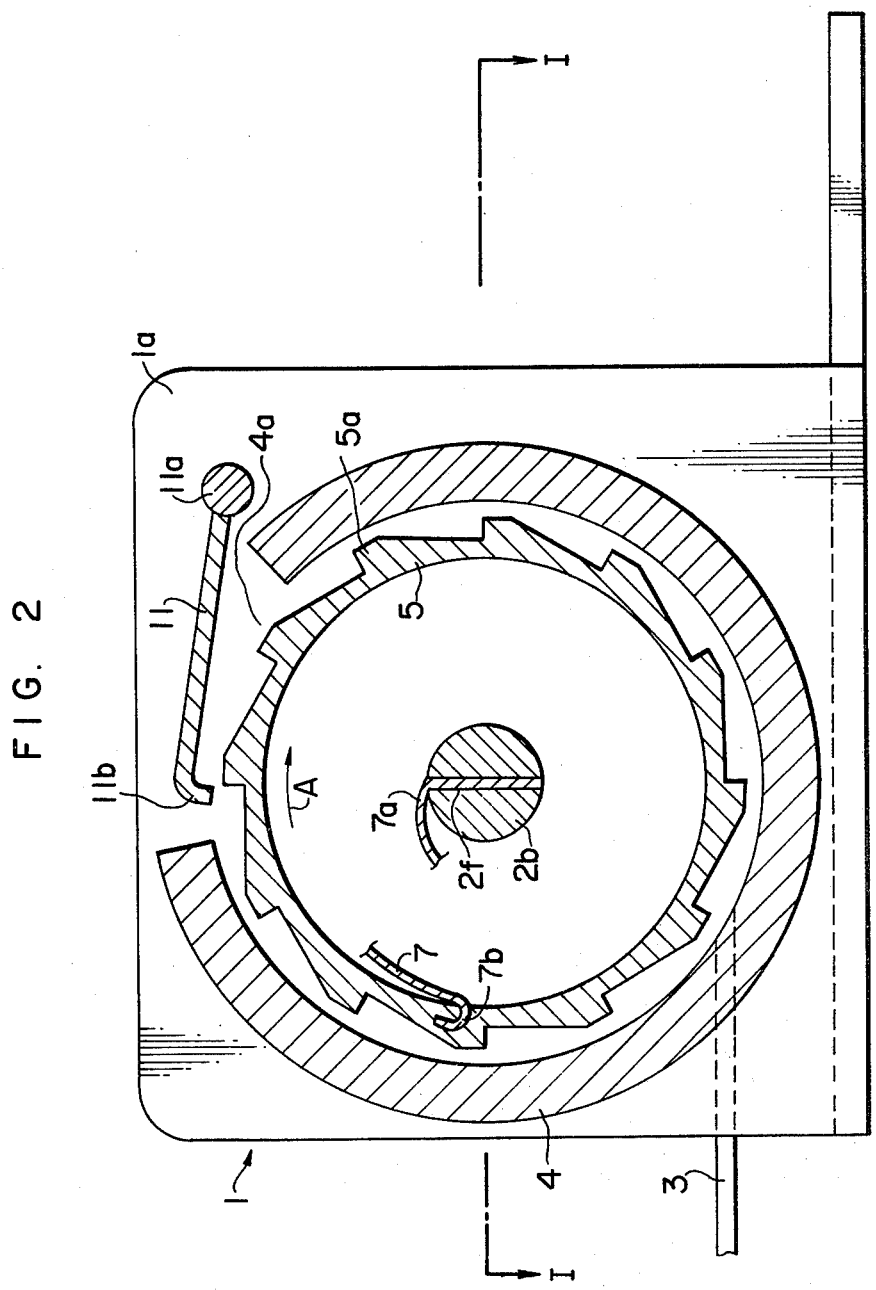
FIG. 2 is a cross sectional view taken along the line II—II of FIG. 1.
Figure 3:
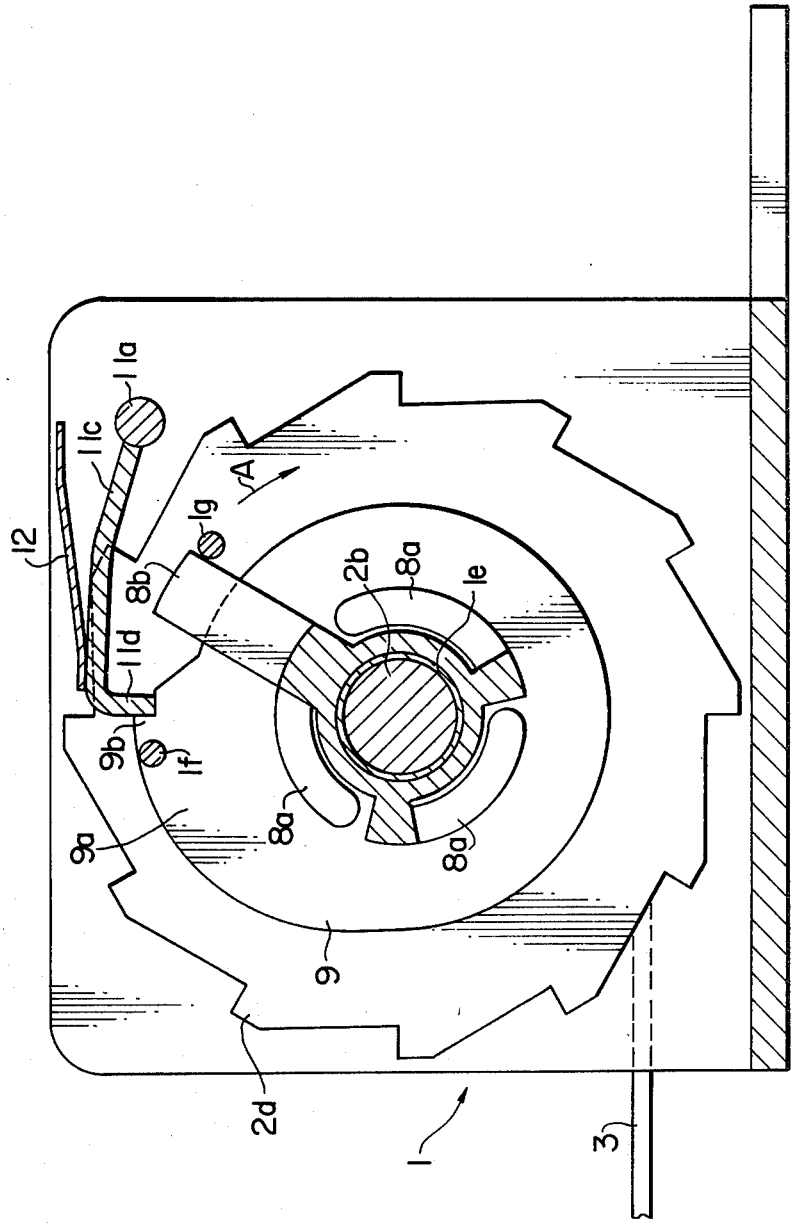
FIG. 3 is a cross sectional view taken along the line III—III of FIG. 1.

Referring to FIGS. 1, 2 and 3, a frame 1, which is the main body of a seat belt retracting device in accordance with the present invention, is formed by the press operation from a thick steel plate, and has side plates 1a and 1b and a mounting hole 1c for anchoring the frame 1 to the floor of an automotive vehicle. A shaft 2b of a winding reel 2 is rotatably supported in bush bearings 1d and 1e made of teflon or the like and attached to the side plates 1a and 1b. The reel 2 includes flanges 2c and 2d and a spool 2a made integral with the shaft 2b. The inner end of a seat belt 3 is securely attached to the spool 2a while the other end is attached to an anchor or a buckle (not shown). As shown in FIG. 3, ratchet teeth are formed in the flanges 2c and 2d. In case of the rapid deceleration of the vehicle, seat belt locking means (not shown) engages the ratchet teeth for locking the seat belt 3, thereby protecting the vehicle occupant.

A cup-shaped case 4, which is molded from suitable synthetic resin, is attached to the side plate 1b, and a ratchet wheel 5 is rotatably supported between a shaft bearing hole 4d formed at the center of the case 4 and the bush bearing 1e. The ratchet wheel 5 includes a large-diameter cylindrical section and a small-diameter cylindrical section, and ratchet teeth 5a are formed around the outer periphery of the large diameter section as shown in FIG. 2. One end of a first spiral spring 6 is attached to the small diameter section 5b while the other end of the first spiral spring 6 is attached to the case 4 so that when the ratchet wheel 5 rotates, the first spiral spring 6 is wound around the small-diameter cylindrical section 5b. One end 7a of a second spiral spring 7, which is disposed inside the large-diameter section, is inserted and attached into a slit 2f of the shaft 2b (See FIG. 2) while the other end 7b is attached to the inner wall of the large-diameter section. The spring force of the second spring 7 is weaker than that of the first spring 6. As shown FIGS. 4 and 5, a projection 2e is provided at one end (the left end in FIG. 1) of the shaft 2b for engagement with a stopper 5c provided on the inner wall of the small-diameter section.

Figure 4:
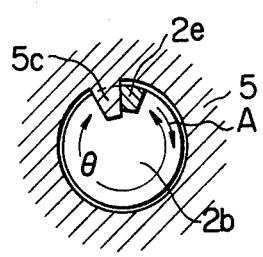
FIG. 4 is a cross sectional view taken along the line IV—IV of FIG. 1, illustrating the engagement of a shaft of a winding reel with a ratchet wheel when a seat belt is completely retracted and wound on a winding reel.
Figure 5:
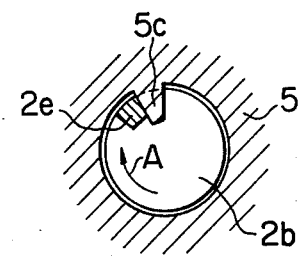
FIG. 5 is a cross sectional view similar to FIG. 4, illustrating the engagement of the shaft with the ratchet wheel when the seat belt is paid out.

The projection 2e engages the stopper 5c as shown in FIG. 4 when the seat belt 3 is retracted and completely wound around the reel 2, while they engage with each other as shown in FIG. 5 when the belt 3 is paid out. More particularly, when the belt 3 is retracted and completely wound around the reel 2, the shaft 2b is exerted with the spring force of the second spring 7 in a direction opposite to that indicated by an arrow A in FIG. 4 so that the projection 2e engages the stopper 5c as shown in FIG. 4. On the other hand, when the seat belt 3 is paid out, the shaft 2b is rotated in a direction indicated by the arrow A in FIG. 4, and only the second spring 7 is wound up because it is weaker in spring force than the first spring 6. At this time, the rotation of the ratchet wheel 5 with respect to the case 4 is not permitted so that the projection 2e comes to engage the stopper 5c as shown in FIG. 5. When the seat belt 3 is paid out, the shaft 2b is rotated in the direction indicated by the arrow A in FIG. 5 with the projection 2e kept in engagement with the stopper 5c so that the ratchet wheel 5 is rotated and consequently the first spring is wound up around the small-diameter section 5b. It should be noted that at this time there exists no relative rotation between the shaft 2b and the ratchet wheel 5 so that the second spring 7 is no longer wound up.

A doughnut-shaped leaf spring 8 and a friction disk 9 are carried by the shaft 2b between the side plate 1b of the frame 1 and the flange 2d of the reel 2. The leaf spring 8, which is made of, for instance, phosphor bronze, includes three spring legs 8a and a lever 8b as shown in FIGS. 3, 6, 7 and 8. The lever 8b is radially outwardly extended and is placed between a retraction stopper 1f and an extension stopper 1g both of which project from the side plate 1b of the frame 1 toward the friction disk 9 so that the angular displacement of the lever 8b is limited between the stoppers 1f and 1g. The friction disk 9 is pressed against the flange 2d under the biasing force of the leaf spring 8, and rotates in unison with the reel 2. A portion of the periphery of the friction disk 9 is somewhat radially outwardly bulged to form a cam portion 9a (See FIG. 6), and the most radially outwardly bulged point is stepped to form a stopper portion 9b (See FIG. 3).

A pawl 11 for selective engagement at its locking pawl 11b with the teeth 5a of the ratchet wheel 5 is attached to one end (on the side of the case 4) of a shaft 11a rotatably supported in and extending through the side plate 1b (See FIG. 2), while an operating lever 11c having its locking pawl 11d engaged with the periphery of the friction disk 9 is attached to the other end (on the side of the disk 9) of the shaft 11a (See FIG. 3). Therefore the operating lever 11c moves or swings in unison with the pawl 11. As shown in FIG. 3, the operating lever 11c is pressed against the peripheral surface of the friction disk 9 under the biasing force of a leaf spring 12 having one end thereof attached to the side plate 1b. When the pawl 11d of the operating lever 11c engages the stopper portion 9b of the friction disk 9 as shown in FIG. 3, the locking pawl 11b of the pawl 11 is moved away from the teeth 5a of the ratchet wheel 5, so that the locking pawl 11b becomes out of engagement with the teeth 5a as shown in FIG. 2.

The friction resistance $F_1$ between the friction disk 9 and the flange 2d, the friction resistance $F_2$ between the leaf spring 8 and the friction disk 9 and the friction resistance $F_3$ between the side plate 1b and the leaf spring 8 have the following relation:

$$F_1 > F_2 > F_3.$$

Therefore when the belt 3 is paid out and thus the flange 2d is rotated, the leaf spring 8 as well as the friction disk 9 rotates in unison with the flange 2d, but after the lever 8b of the leaf spring 8 has engaged the extension stopper 1g, only the friction disk 9 rotates in unison with the flange 2d.

Figure 6:
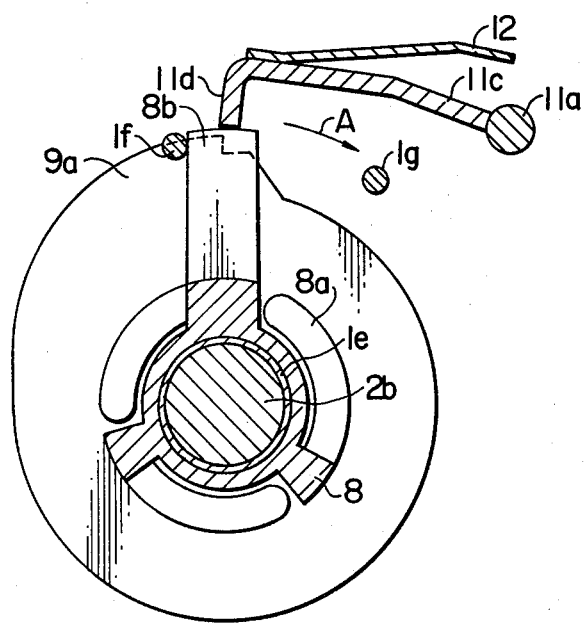
FIG. 6 is an explanative view illustrating the engagement of an operating lever with a lever of a leaf spring shown in FIG. 3.

Next the mode of operation with the first embodiment of the present invention with the above construction will be described. When the seat belt 3 is retracted and completely wound around the reel 2, the projection 2e of the shaft 2b engages the stopper 5c of the ratchet wheel 5 as shown in FIG. 4, and the operating lever 11c is held in a raised position by the lever 8b of the leaf spring 8 as shown in FIG. 6. As a result, the locking pawl 11b of the ratchet 11 is moved away from the teeth 5a of the ratchet wheel 5 as shown in FIG. 2.

Figure 7:
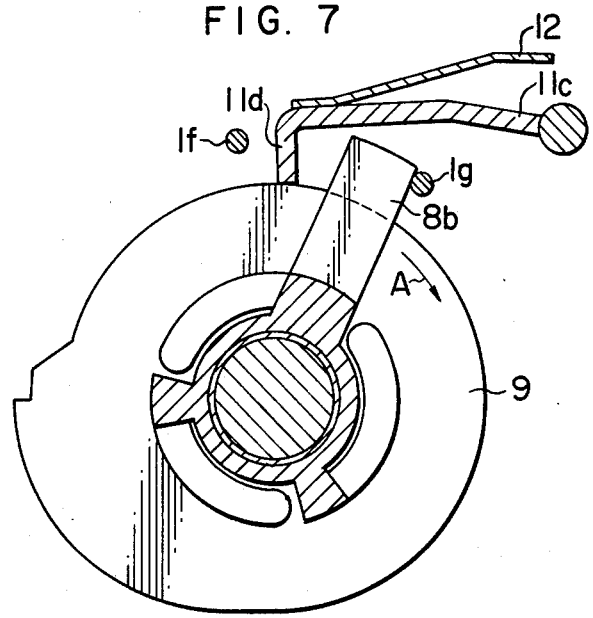
FIGS. 7 and 8 are explanative views similar to FIG. 6, illustrating the engagement of the operating lever with a friction disk in different positions.

When the occupant pays out the belt 3, the latter is unwound from the reel 2 so that the flange 2d and the shaft 2b are rotated in the direction indicated by the arrow A in FIGS. 6 and 4. The friction disk 9 and the leaf spring 8 rotate in unison with the flange 2d so that, as shown in FIG. 7, the lever 8b is disengaged from the pawl 11d of the operating lever 11c and consequently the pawl 11d is pressed against the peripheral surface of the firction disk 9 under the biasing force of the leaf spring 12. The locking pawl 11b of the pawl 11, which swings in unison with the operating lever 11c, engages the teeth 5a of the ratchet wheel 5. However, as is clear from FIG. 2, the locking pawl 11b slides over the inclined surface of the tooth 5a so that the pawl 11b may not prevent or lock the rotation of the ratchet wheel 5.

The lever 8b of the leaf spring 8, having disengaged from the pawl 11d of the operating lever 11c, engages the extension stopper 1g on the side plate 1b as shown in FIG. 7. Thereafter the leaf spring 8 slips over the friction disk 9; that is, the former cannot rotate in unison with the latter so that the former is held in the position shown in FIG. 7. As shown in FIG. 3, when the flange 2d is further rotated so that the friction disk 9 may make almost one rotation from the initial position shown in FIG. 6, the pawl 11d of the operating lever 11c engages the stopper portion 9b of the friction disk 9 as shown in FIG. 3. Consequently, the rotation of the friction disk 9 in the direction indicated by the arrow A is prevented while the reel 2 is rotated as the seat belt 3 is paid out.

When the seat belt 3 is started to be paid out, the projection 2e on the shaft 2b is in engagement with the stopper 5c on the ratchet wheel 5 as shown in FIG. 4 so that the second spring 7, which is weaker in spring force than the first spring 6, is wound. When the shaft 2b makes almost one rotation (through $\theta°$) as shown in FIG. 4, the projection 2e engages the stopper 5c as shown in FIG. 5 so that the rotation of the shaft 2b is transmitted to the ratchet wheel 5. As a result, the first spring 6 is then wound. During the winding of the first spring 6, the relative rotation between the shaft 2b and the ratchet wheel 5 is prevented so that the second spring 7, which has been already wound by almost one rotation of the shaft 2b, may be prevented from being further wound.

When the seat belt 3 is paid out in the manner described above and fastened to restrain the occupant, the belt 3 is somewhat slacked. Therefore, the belt 3 is retracted by the first and second springs 6 and 7 to eliminate the slacks. That is, the flange 2d of the reel 2 is rotated in the direction opposite to that indicated by the arrow A shown in FIG. 3, so that both the leaf spring 8 and the friction disk 9 rotate in this direction in unison with the flange 2d. As a result, when the belt 3 is retracted a little, the relative position between the operating lever 11c and the friction disk 9 changes from the position shown in FIG. 3 to the position shown in FIG. 8. At the latter position, the pawl 11d of the operating lever 11c is disengaged from the stopper portion 9b of the friction disk 9, and thus is made slidable over the peripheral surface of the disk 9. The locking pawl 11b of the pawl 11, which swings in unison with the operating lever 11c, engages the teeth 5a of the ratchet wheel 5 and consequently the ratchet wheel 5 is rotated in the direction opposite to that indicated by A in FIG. 2. As a result, the locking pawl 11b locks the rotation of the ratchet wheel 5. Under this condition, the restoring or unwinding spring force of the first spring 6 is not exerted to the shaft 2b of the reel 2, and only the unwinding spring force of the second spring 7 is exerted to the shaft 2b in a direction in which the belt 3 is retracted and wound around the reel 2. Therefore the tension of the belt 3; that is, the restraining or tightening force exerted to the occupant is dependent only upon the unwinding spring force of the second spring 7.

Furthermore, as described above, the spring force of the second spring 7 is selected to be weaker than that of the first spring 6, and the second spring 7 has been wound only by almost one rotation of the shaft 2b. Therefore the tension exerted on the occupant is reduced and stabilized so that the occupant may experience no unpleasant restraining force and may freely move his body for operating a switch or the like. As described above, when the occupant is using the seat belt 3, the tension of the belt is produced only by the second spring 7 so that the tension may be freely adjusted.

In case of the sudden deceleration of the vehicle due to a collision or the like, the locking means (not shown) immediately engage the ratchet gears formed in the flanges 2c and 2d of the reel 2 to prevent sudden extension of the seat belt 3 so that the belt may securely restrain the occupant from the secondary collision in the vehicle chamber.

Figure 8:
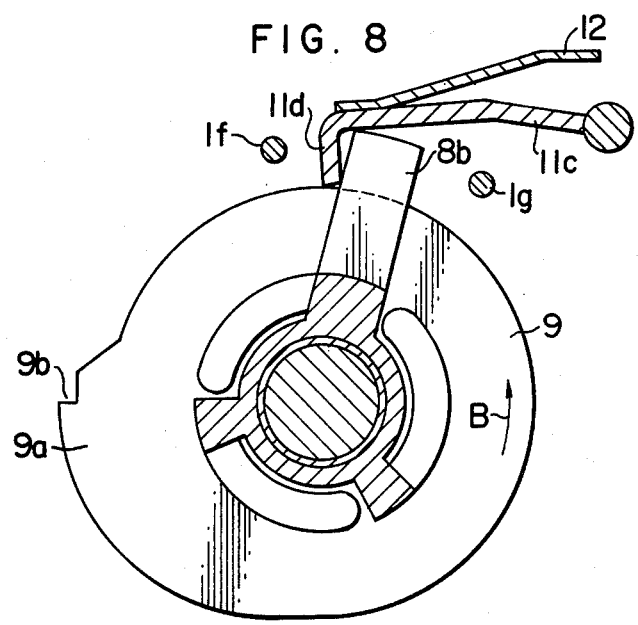

Next the mode of the retraction of the seat belt 3 when the occupant unfastens or release it will be described. Immediately before the seat belt is released, the pawl 11d of the operating lever 11c is in engagement with the lever 8b of the leaf spring 8 as shown in FIG. 8, while the locking pawl 11b of the pawl 11 is in engagement with the teeth 5a of the ratchet wheel 5 so that the unwinding spring force of the first spring 6 is not exerted to the shaft 2b as described above. When the seat belt 3 is unfastened, the unwinding spring force of the second spring 7 is exerted to the reel 2 in a direction indicated by the arrow B in FIG. 8. As described above, the friction resistance $F_1$ between the friction disk 9 and the flange 2d is higher than the resistance $F_2$ between the friction disk 9 and the leaf spring 8, so that the friction disk 9 rotates in unison with the flange 2d in the direction indicated by the arrow B, but the rotation of the leaf spring 8 in the direction B is prevented by the engagement of the lever 8b with the pawl 11d of the operating lever 11c. When the flange 2d has made almost one rotation under the unwinding spring force of the second spring 7, the latter is substantially unwound or released so that no unwinding force is exerted by the second spring 7 to the reel 2, but the friction disk 9 is returned to the initial position shown in FIG. 6. That is, in unison with the rotation in the direction B of the reel 2 under the unwinding spring force of the second spring 7, the friction disk 9 rotates in the direction indicated by the arrow B in FIG. 8, and before the friction disk 9 makes one rotation, the pawl 11d of the operating lever 11c is raised by the cam portion 9a of the friction disk 9 into the position shown in FIG. 6. In the latter position, the lever 8b of the leaf spring 8 engages the retraction stopper 1f so that the leaf spring 8 is held in the position shown in FIG. 6 regardless of further rotation of the friction disk 9. When the pawl 11d of the operating lever 11c is raised as shown in FIG. 6, the locking pawl 11b of the pawl 11 is disengaged from the teeth 5a of the ratchet wheel 5 as shown in FIG. 2 so that the second spring does not produce substantial unwinding force. However, the strong unwinding force of the first spring 6 is now exerted to the reel 2 so that the belt 3 is rapidly retracted and wound around the reel 2. The friction resistances exerted by the friction disk 9 and the leaf spring 8 to the flange 2d are sufficiently lower as compared with the unwinding forces of the first and second springs 6 and 7 so that the friction resistances will not adversely affect the seat belt retracting operation.

Second Embodiment, FIGS. 9 through 16

The second embodiment shown in FIGS. 9 through 16 is substantially similar in construction to the first embodiment described above so that only the parts different from those of the first embodiment will be described. Referring to FIGS. 10A and 10B, the ratchet wheel 5, which is rotatably supported on the flange of the bush bearing 1e attached to the side plate 1b, has ratchet teeth 5a formed on the periphery thereof. The ratchet wheel 5 has six protrusions 5b, 5c, 5d, 5f and 5e formed by punching or the like. The protrusions 5b, 5c and 5d are angularly spaced apart from each other by 90°, and the protrusions 5b are angularly spaced apart by 180° while the protrusions 5c and 5d are angularly spaced apart by 180°. The protrusions 5b and 5d are positioned on a common inscribed circle (indicated by a phantom line in FIG. 10A) whose center coincides with that of the ratchet wheel 5, while the protrusion 5c lies radially inside of the circle. The protrusions 5f and 5e are formed on circumferentially both sides of the protrusion 5d.

One end 6a of a spiral spring 60 which is housed within the case 4 is inserted and fixed in a slit 4b formed in the inner wall of the case 4 while the other or inner end 6b is inserted and fixed in the slit 2f of the shaft 2b. The spring 60 is wrapped around the protrusions 5b through 5f as shown in FIG. 11, and two radially inwardly extending projections 6c of the spring 60 sandwich the protrusion 5d so that not only the spring 60 is securely attached to the ratchet wheel 5 but also it is divided into an outer or a first spring section 6 and an inner or a second spring section 7. The unwinding spring force of the second spring 7 is directly transmitted to the shaft 2b while the unwinding spring force of the first spring 6 is indirectly transmitted to the shaft 2b through the ratchet wheel 5.

As shown in FIGS. 12 and 13, the shaft 2b is formed with an integral flange 2h at an inner end of its small diameter portion on which the spring 60 is wound, and the flange 2h has a radial projection 2e. The projection 2e is formed integral with the flange 2h in a manner that it is rotatable within the inscribed circle passing the inner sides of the protrusions 5b and 5d, however, it is engageable with the protrusion 5c which is formed radially inside of the circle.

Next the mode of operation of the second embodiment will be described. When the belt 3 is retracted and wound around the reel 2, the spring 60 still has some unwinding spring force. Therefore, the belt 3 is completely wound around the reel 2 under this residual unwinding force of the spring 60, and the projection 2e of the shaft 2b is in engagement with the protrusion 5c (to be referred to as the "stopper" hereinafter in this specification) of the ratchet wheel 5 as shown in FIG. 12. The shaft 2b is biased in the direction opposite to that indicated by the arrow A in FIG. 12 under the residual unwinding force of the spring 60. The operating lever 11c is held in the raised position as shown in FIG. 14 as the lever 8b of the leaf spring 8 raises the lever 11c against the leaf spring 12. As a result, the ratchet 11, which swings in unison with the driving lever 11c, is moved away from the teeth of the ratchet wheel 5 as with the case of the first embodiment.

When the occupant pays out the belt 3, the flange 2d and the shaft 2b of the reel 2 are rotated in the direction indicated by the arrow A in FIGS. 12 and 14. The friction disk 9 and the leaf spring 8 are also rotated in the same direction in unison with the flange 2d so that the pawl 11d of the operating lever 11c is disengaged from the lever 8b of the leaf spring 8 and consequently pressed against the periperal surface of the friction disk 9. As a result, the locking pawl 11b of the pawl 11, which swings is unison with the operating lever 11c, engages the ratchet wheel 5. As is clear from FIG. 11, the locking pawl 11b only slides on the slanted surface of the teeth 5a of the ratchet wheel 5 so that the rotation of the ratchet wheel 5 is not locked. The lever 8b of the leaf spring 8, which has been disengaged from the pawl 11d, engages the extension stopper 1g of the side plate 1b of the frame 1. Therefore only the friction disk 9 is permitted to rotate in unison with the flange 2d as the belt 3 is further paid out. When the pawl 11d of the operating lever 11c engages the stopper portion 9b of the friction disk as shown in FIG. 15, the rotation of the friction disk 9 in unison with the flange 2d is not permitted. Therefore, both the leaf spring 8 and the friction disk 9 are held in the position shown in FIG. 15 while the belt is further paid out.

When the paying out of the seat belt 3 is started, the projection 2e on the shaft 2b is in engagement with the stopper 5c of the ratchet wheel 5 as shown in FIG. 12 so that the ratchet wheel 5 is not driven by the shaft 2b until the latter makes almost one rotation in the direction A as the belt 3 is paid out. As a result, only the second spring 7 disposed between the protrusion 5d of the ratchet wheel 5 and the shaft 2b is wound. When the shaft 2b makes almost one rotation, the projection 2e engages the stopper 5c as shown in FIG. 13 so that the rotation of the shaft 2b may be transmitted to the ratchet wheel 5 and consequently the first spring 6 disposed between the protrusion 5d and the case 4 is then wound. During the winding of the first spring 6, there is no relative rotation between the shaft 2b and the ratchet wheel 5 so that the second spring 7 which has been already wound by almost one rotation of the shaft 2b, may be prevented from being further wound.

When the seat belt 3, which has been paid out in the manner described above, is fastened to restrain the occupant, it has some slack. Therefore the belt 3 is retracted by the spring 60 to eliminate the slack of the belt 3. That is, the flange 2d of the reel 2 is rotated in the direction opposite to that indicated by the arrow A in FIG. 15 so that both the leaf spring 8 and the friction disk 9 are caused to rotate in the same direction. When the belt 3 is retracted to eliminate the slack, the relative position between the operating lever 11c and the friction disk 9 changes from the position shown in FIG. 15 to that shown in FIG. 16. More particularly, the pawl 11d of the operating lever 11c is disengaged from the stopper portion 9b of the friction disk 9, and slides on the peripheral surface of the friction disk 9. Therefore the locking pawl 11b of the pawl 11 which swings in unison with the operating lever 11c comes to engage the teeth 5a of the ratchet wheel. Since the ratchet wheel 5 is rotated in the direction opposite to that indicated by the arrow A in FIG. 11, the locking pawl 11b locks the rotation of the ratchet wheel 5. As a result, the unwinding spring force of the first spring 6 is not exerted to the reel 2, but the unwinding spring force of the second spring 7 is exerted to the shaft 2b of the reel 2 in the direction in which the belt 3 is retracted and wound. Therefore the tension of the belt 3; that is the restraining force exerted upon the occupant is dependent upon the unwinding spring force of only the second spring 7 so that the occupant may be restrained under the stable belt tension. As with the case of the first embodiment, locking means (not shown) immediately engage the ratchet teeth of the flanges 2c and 2d of the reel 2 in case of a collision of the vehicle or the like so that the seat belt 3 may be positively prevented from being suddenly paid out.

Next the mode of operation for retracting and winding the belt will be described. Immediately before the belt is unfastened, the locking pawl 11d of the lever 11c is in engagement with the lever 8b of the leaf spring as shown in FIG. 16 while the locking pawl 11b of the pawl 11 is in engagement with the tooth 5a of the ratchet wheel 5, so that the unwinding spring force of the first spring 6 is not exerted to the shaft 2b as described above. The projection 2e of the shaft 2b is in a position indicated by a broken line in FIG. 13. When the seat belt is unfastened or released, the unwinding force of the second spring 7 is exerted to the reel 2 in the direction B in FIG. 16 so that the shaft 2b is rotated in the direction opposite to the direction A in FIG. 13. Since the friction resistance $F_1$ between the friction disk 9 and the flange 2d is higher than the friction resistance $F_2$ between the friction disk 9 and the leaf spring 8, the friction disk 9 rotates in the direction B as the flange 2d is rotated in the same direction in FIG. 16. When the reel 2 and hence its shaft 2b makes almost one rotation under the unwinding spring force of the second spring 7; that is, when the projection 2e of the shaft 2b turns from the position indicated by the broken line in FIG. 13 to the position shown in FIG. 12, the second spring 7 is substantially unwound or released so that no further returning force is transmitted to the reel 2. When the reel 2 and hence its flange 2d make almost one rotation as described above, the friction disk 9 is rotated to the position shown in FIG. 14. More particularly, when the reel 2 is rotated under the unwinding force of the second spring 7 in the direction B in FIG. 16, the friction disk 9 is also rotated in the same direction. Before the friction disk 9 makes one rotation, its cam portion 9a raises the pawl 11d of the operating lever 11c so that the lever 11c is displaced from the position shown in FIG. 16 to the position shown in FIG. 14. As is clear from FIG. 14, the lever 8b of the leaf spring 8 engage retraction stopper 1f so that the leaf spring 8 is held in the position shown in FIG. 14 regardless of further rotation of the friction disk 9. When the lever 11c is raised by the lever 8b of the leaf spring 8, the pawl 11 which swings in unison with the operating lever 11c is disengaged from the ratchet wheel 5 as shown in FIG. 11 so that the unwinding spring force of the first spring 6 is transmitted to the reel 2 and the belt 3 is completely wound around the reel 2.

Third Embodiment, FIGS. 17 through 20

The third embodiment shown in FIGS. 17 through 20 is substantially similar in construction to the first embodiment so that only those parts different from those of the first embodiment will be described. A cup-shaped ratchet wheel 5 is rotatably supported on the shaft 2b within the cup-shaped case 4 attached to the side plate 1b of the frame 1. One end of the second spring 7 which is housed within the cylindrical portion 5g of the ratchet wheel 5 is inserted and fixed in the slit 2f of the shaft 2b while the other end is inserted and fixed in the slit 5h of the wall of the cylindrical portion 5g. One end 6b of the first spring 6 which is housed within the doughnut-shaped space defined between the case 4 and the ratchet wheel 5 is joined to the other end of the second spring 7 at the slit 5h while the other end is inserted and fixed in the slit 4b of the case 4. As with the case of the first embodiment, the first spring 6 is stronger than the second spring 7. The left end portion of the shaft 2b extends through the ratchet wheel 5 and the terminates in a gear 2g. An arcuate projection 4c (See FIGS. 17 and 19) is projected outwardly from the left end surface of the case 4, and is fitted into the annular groove of a doughnut-shaped cam gear member 13 so as to guide the rotation of the member 13. The member 13 includes an internal gear 13a in mesh with the gear 2g of the shaft 2b and a circular cam 13b having an opening 13c. The pawl 11 is pivotally supported on a shaft or a pin 11a which is fixed to the left end surface of the case 4, and a lever 11c is outwardly extending from the pawl 11 at a right angle and slides over the peripheral surface of the cam 13b as best shown in FIG. 19. The pawl 11 is normally pressed against the teeth 5a of the ratchet wheel 5 under the biasing force of a spring (not shown). When the cam gear member 13 rotates and the opening 13c of the cam 13b comes into a position located below the lever 11c, the ratchet 11c is pushed down by the spring (not shown) as shown in FIG. 20 so that the locking pawl 11b of the pawl 11 engages the ratchet wheel 5. The member 13 and the pawl 11 are covered by a cover 14 attached to the case 4.

Next the mode of operation of the third embodiment will be described. When the seat belt 3 is completely wound around the reel 2, the pawl 11 is held in the raised position by the cam 13b as shown in FIG. 19. When the belt 3 is paid out by the occupant, it is unwound from the reel 2, and the cam gear member 13 in mesh with the gear 2g of the shaft 2b is rotated in the direction indicated by the arrow A in FIG. 19. As the belt 3 is paid out, the shaft 2b of the reel 2 is rotated in the direction A in FIG. 18 so that both the first and second spiral springs 6 and 7 are wound. The spring constant of the first spring 6 is larger than that of the second spring 7 so that first the second spring 7 is almost wound. After the second spring 7 has been wound, the rotation in the direction A of the shaft 2b is transmitted to the cylindrical section 5g of the ratchet wheel 5 through the wound second spring 7 so that the first spring 6 is wound.

The gear ratio between the teeth of the gear 2g of the shaft 2b and the teeth of the internal gear 13a is so selected that when the belt 3 is fully paid out, the cam gear member 13 makes almost one rotation from the position shown in FIG. 19. Therefore the pawl 11 is in the position shown in FIG. 20 when the belt 3 is fully paid out and fastened. More particularly, as the belt 3 is paid out, the cam gear member 13 makes almost one rotation in the direction A from the position shown in FIG. 19 so that the opening 13c of the cam 13b is brought to the position opposite to the lever 11c extending from the ratchet 11. Therefore the pawl 11 is pushed down under the biasing force of the spring (not shown) so that its locking pawl 11b engages the tooth 5a of the ratchet wheel 5 as shown in FIG. 20. Thus when the seat belt 3 is fastened, the unwinding spring force of the first spring 6 is exerted to the ratchet wheel 5 in the direction $B_1$ in FIG. 20 while the unwinding spring force of the second spring 7 is exerted to the shaft 2b in the direction $B_2$ in FIG. 20. However, the rotation in the direction B of the ratchet wheel 5 is prevented by the engagement of the locking pawl 11b of the pawl 11 with the tooth 5a of the ratchet wheel 5 so that the unwinding spring force of the first spring 6 is not transmitted to the shaft 2b of the reel 2. Therefore only the unwinding spring force of the second spring 7 is transmitted to the shaft 2b in the direction in which the belt 3 is retracted and wound. As a result, the tension of the belt is reduced when the belt is fastened so that the occupant has less feeling of being restrained.

In case of a collision or the like, locking means (not shown) immediately engages the ratchet teeth formed in the flanges 2c and 2d of the reel 2 to prevent rapid paying out of the belt 3, thereby securely restraining the occupant as with the case of the first and second embodiments.

Next the mode of retracting and winding the seat belt will be described. When the belt is unfastened or released, the shaft 2b is rotated in the direction $B_2$ under the unwinding spring force of the second spring 7 so that the cam gear member 13 is rotated in the direction $B_3$ in FIG. 20. Therefore the slanting surface 13d at one side of the opening 13c of the cam 13b contacts the lever 11c of the pawl 11 and raises the lever 11c over the peripheral surface of the cam 13b. The locking pawl 11b of the pawl 11 is therefore disengaged from the teeth 5a of the ratchet wheel 5 so that the ratchet wheel 5 initiates to rotate in the direction $B_2$ under the unwinding spring force of the first spring 6. Then, the rotation of the ratchet wheel 5 is transmitted to the shaft 2b through the second spring 7, and the unwinding spring force of the first spring 6 rotates the reel 2 to retract and wind the belt 3 around the reel 2.

What is claimed is:

1. A seat belt retracting and winding device comprising:
    a frame having two side plates,
    a winding reel rotatably supported in said side plates and including an integral shaft,
    a seat belt wound on said winding reel, said seat belt being fixed at its inner end to said winding reel,
    a cup-shaped case attached to one of said side plates,
    a ratchet wheel rotatably supported on said shaft, said ratchet wheel having a plurality of ratchet teeth formed on the periphery thereof,
    a first spiral spring having one end fixed to said case and the other end fixed to said ratchet wheel,
    a second spiral spring having one end fixed to said shaft and the other end fixed to said ratchet wheel,
    a pawl operatively releasably engaging the ratchet teeth on said ratchet wheel, and
    cooperative means operable in response to the rotation of said winding reel to bring said pawl into engagement with the ratchet teeth on said ratchet wheel thereby locking the same against rotation, whereby when said seat belt is paid out and fastened across the vehicle occupant the unwinding spring force of said first spring is not exerted to said winding reel while the unwinding spring force of only said second spring is exerted thereto.

2. A seat belt retracting and winding device as set forth in claim 1, further comprising means to limit the relative rotation between the shaft of said winding reel and said ratchet wheel to not more than one rotation.

3. A seat belt retracting and winding device as set forth in claim 1, wherein the spring force of said first spiral spring is selected stronger than that of said second spiral spring.

4. A seat belt retracting and winding device as set forth in claim 1, wherein said cooperative means includes:
    a friction disk disposed between a flange of said winding reel and one of said side plates to which said cup-shaped case is attached and rotatably supported on the shaft of said winding reel, said friction disk having on its periphery a bulged portion,
    spring means interposed between one said side plate and said friction disk for biasing said friction disk against said flange,
    a shaft extending through one said side plate and having said pawl attached to one end thereof, and
    an operating lever attached to the other end of said shaft, said operating lever being movable in union with said pawl and slidable on the peripheral surface of said friction disk.

5. A seat belt retracting and winding device as set forth in claim 1, wherein said cooperative means includes;
    a cam gear member rotatable in association with the shaft of said winding reel, said member including on its periphery a cam portion formed with an opening, and
    a lever secured to said pawl and slidable on said cam portion during rotation of said member, said lever being brought to a position opposite to said opening and engaged with the ratchet teeth on said ratchet wheel so as to lock the same against rotation when said seat belt is paid out and fastened across the vehicle occupant.

6. A seat belt retracting and winding device comprising:
    a frame,
    a winding reel rotatably supported by said frame,
    spring means fixed between said frame and reel and including a first spiral spring and a second spiral spring,
    a seat belt,
    said winding reel having said seat belt wound thereon with a spring force of at least one of said first and second spiral springs,
    clutch means for selectively changing the combination of spring forces of said spiral springs to effect first and second operative conditions representing different combinations of spring forces of said first and second spiral springs, and
    control means operatively connected to said winding reel to detect the movement of the reel in the belt retraction direction for actuating said clutch means to effect change over as between said first and second operative conditions,
    said clutch means being changed over thereby to operate under said first operative condition for reducing the winding force exerted on said seat belt when the seat belt having been paid out is retracted and wound for a predetermined movement of said reel.

7. A seat belt retracting and winding device as set forth in claim 6, wherein said clutch means includes a ratchet wheel which constitutes a connecting member between said first and second spiral springs, and a pawl selectively engaged with said ratchet wheel by means of said control means to selectively reduce the winding force exerted on said seat belt.

8. A seat belt retracting and winding device as set forth in claim 6, wherein said first and second spiral springs are connected in series through said clutch means.

9. A seat belt retracting and winding device as set forth in claim 8, wherein said clutch means includes a ratchet wheel which constitutes a connecting member between said first and second spiral springs, and a pawl selectively engaged with said ratchet wheel by means of said control means to selectively reduce the winding force exerted on said seat belt.

10. A seat belt retracting and winding device as set forth in claim 6, wherein said control means further detects a predetermined amount of winding rotation of said reel for changing over said clutch means to operate under said second operative condition.

11. A seat belt retracting and winding device comprising:
a frame;
a winding reel rotatably supported by said frame;
spring means connected between said frame and said winding reel and including a first spring and a second spring;
said winding reel being adapted to wind thereon a seat belt with a spring force of at least one of said first and second springs; and
means for controlling the combination of spring forces of said first and second springs and operable in response to the rotation of said winding reel for causing said spring means to operate selectively under a first operative condition and a second operative condition exerting smaller and larger spring forces, respectively, on said seat belt, whereby the winding force exerted on said seat belt is reduced when said spring means is operated under said first operative condition.

12. A seat belt retracting and winding device as defined in claim 11, wherein said controlling means includes clutch means for changing the combination of spring forces of said springs to effect selectively said first and second conditions, and clutch control means operatively connected to said winding reel to operate said clutch means in accordance with the rotation of said winding reel due to paying out and winding of said seat belt.

13. A seat belt retracting and winding device as defined in claim 12, wherein both of said first and said second springs exert spring forces on said seat belt when said spring means is operated under said first operative condition, and one of said first and second springs exerts spring force thereon when said spring means is operated under said second operative condition.

14. A seat belt retracting and winding device as defined in claim 13, wherein said clutch means is connected between one end of said first spring and one end of said second spring so that said clutch means can connect said first and said second springs in series.

15. A seat belt retracting and winding device as defined in claim 14, wherein said clutch means includes a ratchet wheel connected between said one end of said first spring and said one end of said second spring, and a pawl selectively engaged with said ratchet wheel, the selective engagement of said pawl with said ratchet wheel being controlled by said clutch control means in accordance with the rotation of said winding reel to selectively reduce the winding force exerted on said seat belt.

16. A seat belt retracting and winding device as defined in claim 12, including a shaft for said winding reel and wherein said clutch control means includes
a first friction member rotatably supported on said shaft of said winding reel and frictionally engaging the latter,
a second friction member being rotatably supported on said shaft and frictionally engaging said first friction member,
each of said first and second friction members having on its periphery a radially outward extension, and
means including an operating lever operatively connected to said clutch means and engageable and disengageable with the extensions of said first and second friction members for causing said operating lever and said extensions to disengage from each other to control said clutch means such that said spring means is changed over to operate under said second operative condition when the seat belt is wound by a predetermined amount onto said winding reel after it has been paid out and for causing said extension of said first friction member and said operating lever to engage with each other to control said clutch means such that said spring means is changed over to operate under said first operative condition when said seat belt is wound onto said winding reel by an amount exceeding said predetermined amount.

17. A seat belt retracting and winding device as defined in claim 15, including a first shaft for said winding reel and a flange on said shaft, and wherein said controlling means includes
a friction disk disposed between said frame and said flange of said winding reel and rotatably supported on said shaft of said winding reel,
said friction disk having on its periphery a bulged portion, a spring member interposed between said frame and said friction disk for biasing said friction disk against said flange,
a second shaft supported by said frame and having said pawl attached to one end thereof, and an operating level attached to the other end of said second shaft,
said operating lever being movable in unison with said pawl and slidable on the peripheral surface of said friction disk.

18. A seat belt retracting and winding device as defined in claim 15, including a shaft for said winding reel and wherein said clutch control means includes a cam gear member rotatable in association with said shaft of said winding reel, said cam gear member including on its periphery a cam portion formed with an opening, said pawl being brought to said opening and engaged with said ratchet wheel so as to lock the latter against rotation when said seat belt is paid out and fastened across the vehicle occupant.

19. A seat belt retracting and winding device as defined in claim 12, wherein said clutch means includes a pawl and a ratchet connected between said springs, and said clutch control means is operable in response to the rotation of said winding reel to bring said pawl into and out of engagement with said ratchet to selectively reduce the winding force exerted on said seat belt.

20. A seat belt retracting and winding device comprising:
a frame,
a winding reel rotatably supported by said frame,
a seat belt wound on said winding reel, a housing secured to said frame, and means housed in said housing and connected between said housing and said winding reel for exerting different spring forces on said winding reel in response to the rotation of said winding reel, said spring force exerting means including a first spring, a second spring and means for controlling the combination of spring forces of said first and said second springs to exert on said winding reel a smaller spring force when said seat belt is paid out and a larger spring force when said seat belt is retracted.

21. A seat belt retracting and winding device as defined in claim 20, wherein said controlling means comprises:

a one-way clutch connected between said first and second springs and including a ratchet and a pawl, and a member connected to said winding reel for controlling said pawl of said one-way clutch to selectively engage with and disengage from said ratchet in response to the rotation of said winding reel to selectively reduce the winding force exerted on said seat belt.

22. A seat belt retracting and winding device comprising:

a frame, a winding reel supported by said frame for winding thereon a seat belt, spring means connected between said frame and said winding reel for exerting on said winding reel a biasing force acting in the seat belt winding direction, said spring means including a first spring and a second spring, and means operatively connected to said winding reel to control the combination of said first and said second springs to thereby change said biasing force, in response to the rotation of said winding reel.

23. A seat belt retracting and winding device comprising:

a frame, a winding reel supported by said frame for winding thereon a seat belt, biasing means secured to said frame and being capable of selectively providing relatively smaller and larger biasing forces and being connected between said frame and said winding reel for exerting on said winding reel a selected one of said smaller and larger biasing forces acting in the seat belt winding direction, and means operatively connected to said winding reel to select the biasing force effected by said biasing means in response to the rotation of said winding reel for causing the biasing means to exert said smaller biasing force when said belt is paid out to any desired length regardless of the amount of belt unwound and said larger biasing force when said belt is retracted.

24. A seat belt retracting and winding device comprising:

a frame, a winding reel rotatably supported by said frame, a seat belt wound on said winding reel, a housing secured to said frame, and means connected between said housing and said winding reel for exerting a selected one of different spring forces on said winding reel in response to the rotation of said winding reel, and means secured to said frame for controlling the amount of said spring forces to cause exertion on said winding reel of a smaller spring force when said seat belt is paid out to any desired length regardless of the amount of belt unwound and a larger spring force when said seat belt is retracted.

25. A seat belt retracting and winding device comprising:

a frame, a winding reel rotatably supported by said frame, a seat belt wound on said winding reel, a housing secured to said frame, and means connected between said housing and said winding reel for exerting different spring forces on said winding reel in response to the rotation of said winding reel, and means for controlling the amount of said spring forces to cause exertion on said winding reel of a smaller spring force when said seat belt is paid out and a larger spring force when said seat belt is retracted, wherein said controlling means comprises:

a one-way clutch including a ratchet and a pawl, and a member connected to said winding reel for controlling said pawl of said one-way clutch to selectively engage with and disengage from said ratchet in response to the rotation of said winding reel to selectively reduce the winding force on said seat belt.

26. In a safety belt retractor having a frame, a spool rotatably journaled on said frame and a safety belt wound on said spool, the improvement comprising the provision of: dual biasing means for automatically applying either of two selectable amounts of biasing on said spool in a belt rewind direction in response to unwinding and winding movement of said spool in a predetermined manner unrelated to the amount of belt unwound from said spool as said belt is placed in use.

27. In a safety belt retractor having a belt storage reel, the improvement comprising the provision of: two individual rewind springs connected in series to said reel for biasing said reel toward a belt wound condition wherein a first one of said two rewind springs is wound by reel unwinding movement and in turn winds the other of said two rewind springs in response to continued unwinding movement of said reel; and means operable in response to a slight rewinding movement of said reel following unwinding movement thereof for blocking out the bias of one of said two rewind springs.

28. In a safety belt retractor having a frame, a belt storage reel mounted for rotation in said frame, a pair of series connected springs connected between said frame and said reel for biasing said reel in a belt retraction direction and including a first spring having one end thereof connected to said frame and a second spring having one end thereof connected to said reel, blocking means connected between the other ends of both said springs and said frame for blocking out the bias of said first spring on said reel, and means responsive to rotation of said reel for moving the blocking means between its blocking and non-blocking positions.

29. The retractor of claim 28 wherein said blocking means comprises a pawl and a ratchet wheel, said pawl being movable by said moving means to engage said ratchet wheel, one of said pawl or ratchet wheel being connected to said frame and the other of said pawl or ratchet wheel being connected between said other ends of said springs, whereby when said pawl is moved into engagement with said ratchet wheel by said moving means said first spring is blocked from biasing said reel in the belt retracting direction.

* * * * *